3,008,943
POLYMERIZATION CATALYST
Walter R. F. Guyer, Short Hills, N.J., assignor to Esso Research and Engineering Company, a corporation of Delaware
No Drawing. Filed Dec. 1, 1955, Ser. No. 550,515
9 Claims. (Cl. 260—93.7)

The present invention relates to polymerization catalysts, methods of preparing such catalysts and polymerization reactions carried out in the presence of such catalysts. More particularly, the invention pertains to catalysts used in the catalytic polymerization of olefins at relatively low pressures for the production of polymers of high molecular weight and to the preparation of such catalysts.

In one of its aspects, the invention involves the polymerization of olefins such as ethylene to polymers such as polyethylene of high molecular weight, at relatively low pressures in the presence of catalysts obtained by reacting a reducing metal-containing material with a reducible heavy metal compound in a new method of preparation. This new method of preparation, which in itself is an important aspect of the invention, has for its principal feature the use of a catalyst support of large surface area which is insoluble in any liquid reaction medium used in the catalyst-forming reaction and/or in the polymerization reaction itself.

Prior to the present invention it has been found that ethylene and other olefins such as propylene, isobutylene, etc., may be polymerized at relatively low pressures not substantially exceeding atmospheric pressure in a liquid reaction medium when using various combinations of reducing metals or metal compounds, e.g. alkali and alkaline earth metals, their hydrides and alloys; aluminum compounds, such as aluminum hydride, aluminum alkyls, e.g. trialkyls, alkyl aluminum halides, etc.; with various reducible heavy metal compounds, such as the halides, acetyl acetonates, etc., of the metals of groups IV–VI and VIII of the periodic system, e.g. of titanium, zirconium and iron in a liquid solvent for the catalyst components. The reaction leads to the formation of a soluble catalyst portion and an insoluble precipitate consisting primarily of reduced heavy metal component, which together form the active polymerization catalyst.

Among the most active types of catalyst for this reaction are combinations of trialkyl aluminum or dialkyl aluminum halide with titanium tetrahalide. More specifically, excellent results have been obtained when using combinations of triethyl aluminum or diethyl aluminum chloride with titanium tetrachloride, obtained by simply mixing the catalyst components at atmospheric temperature in suitable solvents. These catalysts have been found to afford high yields of good quality, high molecular weight, solid high softening point polymers of ethylene and other olefins even at pressures as low as, or closely approaching, atmospheric pressure.

However, it has been difficult heretofore to prepare these catalysts in a fully reproducible manner with respect to the properties of the finished catalyst, particularly its efficiency which determines the yield obtained in the polymer reaction. Wide variations in catalyst efficiency may be caused by the formation of thin "skins" of polymer on part or all of the insoluble portion of the catalyst or by the occlusion of soluble catalyst components within the insoluble portion so as to become inaccessible to the olefin to be polymerized. Also, uneven distribution of the catalyst components and/or the total catalyst in the reaction medium of the polymerization reaction may contribute to irregularities in catalyst efficiency and polymer yield. The present invention overcomes, or at least greatly alleviates, these drawbacks and affords various additional advantages as will become apparent hereinafter.

In accordance with the present invention, polymerization catalysts of consistently high catalyst efficiency are produced by intimately contacting a metal-containing material having reducing activity with a reducible heavy metal compound in a liquid medium in the presence of a catalyst support of high surface area which is solid at the catalyst-formation and polymerization conditions and insoluble in liquid reaction media used in the catalyst formation and/or polymerization reactions. Catalyst supports useful for the purposes of the present invention may be chosen from a wide variety of inorganic materials of large surface area which have no detrimental effect on the performance of the finished catalyst and the yield and properties of the polymer formed. The support is, as a rule, catalytically inert although some supports may have slight polymerizing activity.

In general, the catalyst support of the invention forms a major proportion of the finished catalyst so as to afford the largest catalyst surface and the highest catalyst dispersion possible. Proportions of, say, about 50 to 99 wt. percent of catalyst support and 1 to 50 wt. percent of active catalyst component, based on total catalyst may be used. Catalysts consisting to about 80 to 99 wt. percent of support and about 1 to 20 wt. percent of active constituents are preferred. Such proportions of catalyst support correspond in normal operation to amounts of about 0.05 to about 5 wt. percent based on final polymer product. However, the use of substantially larger proportions of catalyst support, say up to about 50 wt. percent or more of the final polymer product, is within the broader scope of the invention. In this case, the catalyst support may be so chosen that its retention in the final polymer product will have no detrimental effect on the product and may even modify the same in a beneficial manner.

For example, the carrier materials can be used as models or jigs or foundations onto which new polymer is systematically built, in part being influenced by the underlying carrier structure. If a substantial amount of the original carrier material is present, the favorable properties of the polyolefin are superimposed on those of the carrier material. By using a series of operations, sandwich-type products can be built up, in which several types of products can be combined with one another.

Of course, the operation may be so conducted as to permit the separation of the catalyst support from the product polymer. For this purpose, for example, a catalyst support which is soluble in a medium in which the polymer is insoluble, may be chosen. An example of such supports is alumina which is soluble in aqueous acids or alkalis. The choice of carriers suitable for this specific purpose is facilitated, particularly in the case of polyethylene as the product polymer, because of the fact that crystalline polymers of this type are insoluble in most conventional solvents, aqueous acids and alkalis at temperatures below 100° C. In preparing the catalyst, the catalyst support of the invention may be introduced into the catalyst preparation zone where it is preferably first contacted with the reducible heavy metal compound such as $TiCl_4$ dissolved in a solvent. The slurry may be heated if desired to complete the "adsorption" of the heavy metal compound on the carrier. The "mixture" is then brought in contact with the reducing compound such as an aluminum alkyl compound (e.g. $AlR_3$ or $AlR_2Cl$, or $AlRCl_2$ etc.) dissolved in a suitable solvent.

However, the order of formulating the catalyst-carrying composite can ve varied to suit particular situations. Thus, the heavy metal compound can be adsorbed first or last, or simultaneously, with respect to the reducing metal component. In the case of porous supports it may be preferred to avoid permeation of the adsorbent by the reducing material if this would cause a loss in effectiveness by occlusion. In some cases, this can be done by adding sufficiently large amounts of the heavy metal component so as to fill the pores (e.g. with $TiCl_4$) before contacting with the reducing material, e.g. alkyl metal.

The catalyst mixture so obtained may then be aged at suitable conditions of time and temperature, etc. It is generally preferable to exclude any olefinic material from the catalyst throughout the process of its preparation so that its active form is fully established before any olefin participates in the reaction. The finished catalyst may be introduced into the polymerization zone on a batch, semi-continuous, or continuous basis, and the olefin polymerization reaction in turn may be carried out either batch-wise, semi-continuously, or continuously.

In organic carrier materials may be chosen from the following: synthetic or natural zeolites; finely divided low surface area materials, e.g. highly calcined materials, metals, glass, Alundum; high surface area carriers of either (a) the non-porous type (surface areas in excess of about 5 m.²/g. and submicron particle size, such as titania, zinc oxide, iron oxide pigments, kaolin, etc.); or (b) the porous type (natural products, inorganic skeletal products; activated carbons, synthetic dry gels, such as titania, alumina, iron oxide, etc., prepared from colloidal dispersions). Other types of useful inorganic materials and special factors to be recognized, are discussed in volume I, Catalysis, Emmett, chapters 6 and 7. Oxides, sulfides, oxyhalides, etc. are likewise included. The materials may be produced separately, or, if desired, in situ in a solvent useful in the preparation of the polymerization catalyst.

The physical condition of the carrier materials can be varied to achieve desired advantages. Thus, the above materials can be highly shredded or pulverized to give materials as fine as cobwebs or particles in the micron range, or the materials can be somewhat larger. If highly diminished in size, these materials serve to give a high surface area to volume ratio, which is desired in certain instances. As an alternative, those of the above materials which are synthetic can be so prepared as to develop a highly porous or net-work or cellular type of structure, into which the catalyst is introduced, and throughout which the new polymeric product is caused to form or develop. In other instances, these various materials can be treated with solvents or other chemical agents in order to extend the system. In still other instances, a solvent can be used to dissolve the materials which are then caused to be "precipitated" in a partial or complete degree, the choice of the solvent being governed by compatibility with catalyst and reactants.

Regarding suitable active catalyst components, those employed and described heretofore in the low pressure liquid phase polymerization of low molecular weight olefins to form high molecular weight polymers of the plastics type may be used. Thus, a list of reducing catalyst components of outstanding utility includes the following aluminum compounds: tri n-octyl aluminum, triisobutyl aluminum, tripropyl aluminum and triethyl aluminum; and dialkyl aluminum halides such as diethyl aluminum halides. Useful aluminum compounds of somewhat lower reducing activity include the following: dimethyl aluminum halides, trimethyl aluminum, methyl and ethyl aluminum dihalides, higher dialkyl aluminum halides and trialkyl aluminum compounds having alkyl groups higher than about $C_{10}$. Mixtures of aluminum alkyls can also be used to reduce the heavy metal compounds. For example, mixtures containing ethyl aluminum dichloride and diethyl aluminum chloride have been successfully used to produce active catalysts in this manner. Similarly, mixtures of ethyl aluminum dichloride and triethyl aluminum or of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Reducible heavy metal compounds suitable for the purposes of the invention include such inorganic compounds as the halides, oxy-halides, complex halides, oxides, hydroxides, and organic compounds such as alcoholates, acetates, benzoates and acetyl acetonates of the transition metals of the IV, V, VI and VII periods of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are relatively readily reducible titanium tetrabromide, titanium tetrachloride and zirconium acetylacetonate. The relatively difficultly reducible compounds include ferrous chloride, chromic chloride and manganese chloride.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component.

The catalysts are quite generally prepared by intimately mixing the aluminum compound or other reducing component and the heavy metal compound preferably in a solvent or diluent and in a non-oxidizing atmosphere while stirring. Paraffinic hydrocarbons, such as heptane or other saturated petroleum or synthetic hydrocarbon oils, are the most suitable solvents.

The molar ratio of the aluminum compound to the heavy metal compound in the catalyst mixture may vary widely. In general, the higher the polymer molecular weight desired the higher should be this ratio. A preferred molar ratio for alkyl aluminum compounds to titanium tetrachloride for making polymers above 20,000 molecular weight is about 0.2–12:1, molar ratios of 0.2–6:1 and especially substantially equimolar proportions, based on metal, being suitable in many cases.

The polymerization process employing the catalysts prepared in accordance with the invention is carried out at conditions normally used heretofore in the low pressure polymerization of olefins to prepare high molecular weight polymers suitable as "plastics" and for similar purposes. These conditions depend somewhat on the specific olefin involved and on the type of polymer desired. Ethylene is the preferred olefin although higher olefins, such as propylene, butylenes, styrene, hexadecene, butadiene, etc., may be used alone or in mixtures. The polymers produced have molecular weights above 2000 and may range as high as from 300,000–3,000,000 and more as determined by the intrinsic viscosity method using the I. Harris correlation (J. Polymer Science, 8, 361 (1952)). In the case of ethylene, the polymerization is carried out by intimately contacting gaseous ethylene with the catalyst of the invention, for example by bubbling the ethylene into a suspension of the catalyst in an inert solvent or diluent. Neither the polymerization temperature nor the polymerization pressure is particularly critical. It is preferred, however, to operate at temperatures of about 0°–150° C., such as 25°–90° C.

Pressures ranging anywhere from atmospheric or subatmospheric to 250 atmospheres have been used heretofore in the low pressure polymerization of ethylene and other olefins on catalysts of the type improved by the present invention. Similar pressures may be used for the process of the invention.

The reaction is preferably carried out under careful exclusion of oxygen while stirring in batch or continuous operation. When operating batchwise, olefin introduction is continued until the catalyst is exhausted and the reaction ceases. In order to permit stirring even after the formation of substantial amounts of solid polymer solvents or diluents may be used. These diluents which should be liquid at the operating conditions include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or dichlorobenzenes; ethers such as dibutyl ether, dioxane, tetrahydrofurane; and mixtures thereof. The polymer concentration in the reaction mixture may be about 5–40%.

The amount of catalyst used may vary within wide limits depending somewhat on the purity of the olefin feed. Proportions of as little as 0.1 part by weight of active catalyst constituent per 1,000 parts by weight of olefin are sufficient if the feed is pure. With olefin feed streams containing about 0.01% of water, oxygen, carbon dioxide or certain other oxygenated compounds, catalyst proportions of about 0.5–5 wt. percent on the same basis are usually adequate.

Upon completion of the polymerization reaction, the catalyst is completely deactivated, e.g. by the addition of an alcohol, such as isopropyl alcohol or n-butyl alcohol in amounts of about 10–100 times the amount of catalyst used. The reaction slurry may then be filtered, the filter cake reslurried in a catalyst solvent, such as dry, concentrated alcohol at about 50°–100° C. for 15–60 minutes, filtered again and the filter cake dried, preferably under reduced pressure. Ash residues in the polymer are reduced below about 0.05% by this procedure.

The polymers produced by the present invention are at least equal in quality and, in many cases superior, to those produced by conventional low pressure polymerization processes. This and other more specific aspects of the invention will be best understood by reference to the following specific examples.

Example I

A polymerization catalyst was prepared by dissolving 1.6 g. titanium tetrachloride and 2.0 g. aluminum triethyl each in 100 cc. of dried normal heptane. The titanium tetrachloride solution was first mixed with 15 g. of rutile titanium dioxide and this carrier was saturated with the solution for 5–10 minutes at room temperature. Then the aluminum triethyl solution was added and reaction between the catalyst components was allowed to proceed for 15 minutes, at the end of which time 500 cc. of normal heptane was added and gaseous propylene was passed in at atmospheric pressure. At the end of 3.6 hours, the mixture contained, in addition to the 15 g. of titanium dioxide, 30 g. of solid insoluble propylene polymer and 11 g. of soluble solid propylene polymer.

Example II 15 grams of a commercial synthetic calcium-aluminum silicate of the "molecular sieve" type having an average pore size of about 5–8 A. were slurried in normal heptane, 0.8 gram of titanium tetrachloride was added and the carrier was saturated with the titanium tetrachloride as described in Example I. Diethyl aluminum chloride (0.5 g.) was added to start the catalyst precipitation. After the catalyst components had reacted for 25 minutes at room temperature, 300 cc. of heptane solution were added and gaseous propylene was passed in at atmospheric pressure. After 1.7 hours of reaction the mixture contained about 4 g. of solid insoluble polypropylene polymer (in addition to the 15 g. of molecular sieve material) and an additional 4 g. of soluble solid polypropylene.

In Examples I and II above, the polymerization reactions were carried out with the temperature gradually being raised from room temperature to 75° C. The propylene was scrubbed through solutions of alkyl metal compounds in order to remove impurities before entering the reactor.

The invention is not limited to the specific figures of the foregoing examples. The relative proportions of the materials used and the reaction conditions may be varied within the limits indicated in the specification to obtain products of varying characteristics.

What is claimed is:

1. A method of preparing catalyst for the polymerization of olefins at low pressure which comprises contacting in a liquid medium a trialkyl aluminum compound with titanium tetrachloride in the presence of from 50 to 99 wt. percent (based on the weight of catalyst) of a solid carrier material having a large surface area and which is insoluble in said medium, said carrier material being chosen from the group consisting of calcium aluminum silicate zeolite molecular sieves, and titanium oxides.

2. The method of claim 1 in which said carrier material is catalytically substantially inert.

3. A catalyst for the polymerization of olefins consisting essentially of the product of the reaction of a trialkyl aluminum compound, titanium tetrachloride; and from 50 to 99 wt. percent based on the weight of catalyst of a solid carrier material of large surface area retaining its solid state in the course of said polymerization, said carrier material being chosen from the group consisting of calcium aluminum silicate zeolite molecular sieves, and titanium oxides.

4. The process of polymerizing olefins which comprises contacting said olefin at polymerization conditions with a catalyst as defined in claim 3.

5. The process of claim 4 in which said olefin is selected from the group consisting of ethylene and propylene and said conditions include pressures not substantially exceeding atmospheric pressure.

6. The process of claim 4 in which the polymer produced by said polymerizing process is washed with a solvent which dissolves said carrier, said polymer remaining undissolved.

7. In the polymerization of at least one α mono-olefinic hydrocarbon to form solid polymer, the improvement which comprises effecting the polymerization at 20–150° C. in liquid medium in the presence of trialkyl aluminum wherein each alkyl group contains 1 to 10 carbon atoms, titanium tetrachloride and a calcium aluminum silicate zeolite molecular sieve, the molar ratio of said trialkyl aluminum to said titanium tetrachloride being in the range from 1:4 to 12:1.

8. A method of preparing a catalyst for the polymerization of olefins which comprises contacting in a liquid medium titanium tetrachloride with a trialkyl aluminum compound at reducing conditions in the presence of finely divided titanium dioxide.

9. In the polymerization of at least one monoolefinic hydrocarbon to form solid polymer, the improvement which comprises effecting the polymerization at 20 to 150° C. in liquid medium in the presence of trialkyl aluminum wherein each alkyl group contains 1 to 10 carbon atoms, titanium tetrachloride, and 50 to 99 wt. percent (based on catalyst) of an inorganic solid carrier material having a large surface area and which is insoluble in said liquid medium, said carrier material being chosen from the group consisting of calcium aluminum silicate zeolite molecular sieves, and titanium oxides, the molar ratio of said trialkyl aluminum to said titanium tetrachloride being in the range of 1:4 to 12:1.

References Cited in the file of this patent

UNITED STATES PATENTS

| | | |
|---|---|---|
| 2,467,162 | Schutze | Apr. 12, 1949 |
| 2,491,116 | Kraus et al. | Dec. 13, 1949 |
| 2,727,024 | Field et al. | Dec. 13, 1955 |
| 2,728,758 | Field et al. | Dec. 27, 1955 |
| 2,758,107 | Heiligmann et al. | Aug. 7, 1956 |
| 2,824,089 | Peters et al. | Feb. 18, 1958 |
| 2,825,721 | Hogan et al. | Mar. 4, 1958 |
| 2,843,577 | Friedlander et al. | July 15, 1958 |
| 2,862,917 | Anderson et al. | Dec. 2, 1958 |
| 2,871,276 | Eiszner | Jan. 27, 1959 |
| 2,909,512 | Bruce | Oct. 20, 1959 |
| 2,912,419 | Peters et al. | Nov. 10, 1959 |

FOREIGN PATENTS

| | | |
|---|---|---|
| 534,792 | Belgium | Jan. 31, 1955 |